United States Patent
Gao et al.

(10) Patent No.: US 12,022,843 B2
(45) Date of Patent: Jul. 2, 2024

(54) YOGURT MAKER AND METHOD FOR USING THE SAME

(71) Applicant: SANDORA HOUSEHOLD ELECTRIC APPLIANCES (SHENZHEN) LTD., Shenzhen (CN)

(72) Inventors: Xianjiang Gao, Shenzhen (CN); Kwokwai Wong, Shenzhen (CN); Marko Unger, Shenzhen (CN)

(73) Assignee: SANDORA HOUSEHOLD ELECTRIC APPLIANCES (SHENZHEN) LTD., Shenzhen (CN)

( * ) Notice: Subject to any disclaimer, the term of this patent is extended or adjusted under 35 U.S.C. 154(b) by 662 days.

(21) Appl. No.: 17/267,409

(22) PCT Filed: Dec. 18, 2020

(86) PCT No.: PCT/CN2020/137764
§ 371 (c)(1),
(2) Date: Feb. 9, 2021

(87) PCT Pub. No.: WO2022/016795
PCT Pub. Date: Jan. 27, 2022

(65) Prior Publication Data
US 2022/0295808 A1 Sep. 22, 2022

(30) Foreign Application Priority Data

Jul. 24, 2020 (CN) .......................... 202010728815.7

(51) Int. Cl.
*A23C 9/12* (2006.01)
*A23C 9/123* (2006.01)
(Continued)

(52) U.S. Cl.
CPC ............ *A23C 9/1223* (2013.01); *A23C 9/123* (2013.01); *B01F 23/53* (2022.01); *B01F 27/808* (2022.01);
(Continued)

(58) Field of Classification Search
CPC ...... A47J 31/4403; A47J 31/465; A47J 31/60; A47J 43/046; A47J 27/004; A47J 31/3623;
(Continued)

(56) References Cited

U.S. PATENT DOCUMENTS 5,054,383 A * 10/1991 Cho .................... A23C 9/1226
99/348
2009/0280214 A1* 11/2009 Kim ....................... A23C 9/123
99/348

(Continued)

FOREIGN PATENT DOCUMENTS

| CN | 202267311 U | 6/2012 |
| CN | 203506429 U | 4/2014 |

(Continued)

OTHER PUBLICATIONS

The World Intellectual Property Organization (WIPO) International Search Report for PCT/CN2020/137764 Jul. 24, 2020 9 Pages (including translation).

*Primary Examiner* — Chris Q Liu
(74) *Attorney, Agent, or Firm* — ANOVA LAW GROUP, PLLC (57) ABSTRACT

The present disclosure discloses a yogurt maker and its method of use for using the same. A vertical upwardly extending mixing container protrusion is set at the bottom of the mixing container of the yogurt maker and a mixing head is detachably sleeved on the mixing container protrusion, and the rotation of the mixing head is driven by a power (Continued)

device so that the mixing head can mix the mixture in the mixing container well. At the same time, a temperature sensor is installed at the bottom of the mixing container to monitor the temperature of the mixing container, so as to ensure constant heat preservation conditions in different environments. The mixing device can be detached easily, which eliminates hygienic blind spots and ensures that the yogurt maker can be cleaned easily after making yogurt.

18 Claims, 7 Drawing Sheets

(51) Int. Cl.
  *B01F 23/53*   (2022.01)
  *B01F 27/808*   (2022.01)
  *B01F 27/93*   (2022.01)
  *B01F 35/21*   (2022.01)
  *B01F 35/221*   (2022.01)
  *B01F 35/32*   (2022.01)
  *B01F 35/90*   (2022.01)
  *B01F 35/93*   (2022.01)
  *B01F 101/07*   (2022.01)

(52) U.S. Cl.
  CPC .......... *B01F 27/93* (2022.01); *B01F 35/2115* (2022.01); *B01F 35/2215* (2022.01); *B01F 35/3204* (2022.01); *B01F 35/93* (2022.01); *B01F 2035/99* (2022.01); *B01F 2101/07* (2022.01)

(58) Field of Classification Search
  CPC .... A47J 43/0465; A47J 43/085; A47J 19/027; A47J 27/14; A47J 31/3676; A47J 31/407; A47J 31/41; A47J 31/4467; A47J 31/469; A47J 31/56; A47J 36/32; A47J 43/044; A47J 43/06; A47J 43/0705; A47J 43/0716; A47J 43/0727; A47J 43/0766; A47J 43/27; B01F 27/808; B01F 35/92; B01F 2035/99; B01F 35/3204; B01F 2101/07; B01F 23/53; B01F 27/90; B01F 27/93; B01F 33/4535; B01F 33/5014; B01F 35/2115; B01F 35/2215; B01F 35/93; B01F 35/94; B01F 2035/98; B01F 2101/14; B01F 23/47; B01F 23/471; B01F 25/42; B01F 25/431; B01F 27/091; B01F 27/80; B01F 29/4033; B01F 29/64; B01F 33/452; B01F 33/8212; B01F 35/1453; B01F 35/2113; B01F 35/2117; B01F 35/32045; B01F 35/3213; B01F 35/4111; B01F 35/451; B01F 35/60; B01F 35/717611; B01F 35/71805; B01F 35/7546; B01F 35/7548; B01F 35/832; B67D 1/0078; B67D 1/0462; B67D 1/1466; B67D 2210/00026; B67D 1/0016; B67D 1/0431; B67D 1/0804; B67D 1/0858; B67D 1/0861; B67D 1/0884; B67D 1/0895; B67D 1/127; B67D 2001/0091; B67D 2001/075; B67D 2210/00031; B67D 2210/00118; B67D 2210/0012; B67D 2210/00128; B67D 1/004; B67D 1/07; B67D 1/1245; B67D 1/1272; B67D 1/16; B67D 2210/00125; A23C 9/1223; A23C 9/123; A23C 9/1226; A23C 11/02; A23C 11/103; A23C 2260/152; A23C 9/12; A23C 9/122
  USPC ......... 99/348, 283, 285, 295, 327, 331, 339, 99/357, 453, 455, 468, 470, 486
  See application file for complete search history.

(56) References Cited

U.S. PATENT DOCUMENTS

| | | | |
|---|---|---|---|
| 2011/0041704 A1* | 2/2011 | Feierabend | A47J 43/0465 |
| | | | 99/323.1 |
| 2011/0116340 A1* | 5/2011 | Gerl | B22C 5/044 |
| | | | 366/145 |
| 2013/0199215 A1* | 8/2013 | Winkler | A23G 9/12 |
| | | | 62/340 |
| 2017/0156358 A1* | 6/2017 | Choudhary | C12M 41/18 |

FOREIGN PATENT DOCUMENTS

| | | |
|---|---|---|
| CN | 104542963 A | 4/2015 |
| CN | 104839330 A | 8/2015 |
| CN | 106724944 A | 5/2017 |
| CN | 209463245 U | 10/2019 |
| CN | 111728029 A | 10/2020 |
| CN | 213153745 U | 5/2021 |
| IN | 203388698 U | 1/2014 |
| WO | 2009097705 A1 | 8/2009 |

* cited by examiner

YOGURT MAKER AND METHOD FOR USING THE SAME

CROSS-REFERENCES TO RELATED APPLICATIONS

This application is a national stage application of PCT Patent Application No. PCT/CN2020/137764, filed on Dec. 18, 2020, which claims priority to Chinese Patent Application No. 202010728815.7, filed on Jul. 24, 2020, the content of all of which is incorporated herein by reference.

FIELD OF THE APPLICATION

The present disclosure relates to a beverage-making device, in particular to a yogurt maker and method for using the same.

BACKGROUND

Yogurt is a sweet and sour milk-based beverage. In order to ensure food safety and avoid additives, modern families will use home yogurt makers to make fresh yogurt. However, the fermentation temperature of lactic acid bacteria is optimally 43° C., and it needs to be kept at 43° C. for 8-10 hours when making yogurt. Therefore, when making yogurt, the mixture of milk and lactic acid bacteria needs to be heated continuously to ensure that the temperature of the mixture remains constant. In order to ensure that the temperature of the mixture is maintained uniformly throughout, the mixture needs to be stirred continuously during the fermentation process, but manual stirring is time-consuming and laborious, and is unable to achieve a good mixing effect.

In order to solve the above-mentioned problems, in the prior art, a stirring rod or stirring blades are generally added to the yogurt maker to stir the mixture of milk and lactic acid bacteria well by machine stirring; at the same time, a heating device is added at the bottom of the yogurt maker to continuously heat the mixture. However, there are also problems with the prior art. After a stirring rod or stirring blades are added to the yogurt maker, it is difficult to clean between the stirring rod or stirring blades and the wall or the bottom of the cup of the yogurt maker, and the mixing device has hygienic blind spots that make it difficult to clean the yogurt maker. Long-term use will cause the quality of the yogurt to be reduced, and even cause food safety problems. In another respect, the temperature of the mixture of milk and lactic acid bacteria cannot be detected effectively with the addition of a heating device at the bottom of the yogurt maker; there are delays in temperature control, which lead to large temperature fluctuations in the yogurt fermentation process that affect the final yogurt quality.

Therefore, there is room for the improvement and development of the prior art.

BRIEF SUMMARY OF THE DISCLOSURE

In view of the above-mentioned shortcomings of the prior art, the objective of the present disclosure is to provide a yogurt maker and its method of use, in order to solve the problem of the decline in final yogurt quality due to the poor cleaning and unstable temperature control of the yogurt maker of the prior art.

The technical solution of the present disclosure is as follows:

A yogurt maker, it comprises:
a base;
a mixing container, the mixing container is placed on the base, a center of a bottom of the mixing container extends vertically upward to form a cylindrical mixing container protrusion, and the mixing container is used for fermentation to make yogurt;
a mixing device, the mixing device includes a mixing head that can be detachably sleeved on the mixing container protrusion, and the mixing device is used for mixing the yogurt in the mixing container well;
a temperature control device, the temperature control device comprises a heater that encircles the mixing container and a temperature sensor that is in contact with the bottom of the mixing container. The temperature control device is used for controlling a temperature of the yogurt in the mixing container during different fermentation stages.

In the yogurt maker, the mixing head is toroidal, an inner ring of the mixing head matches the mixing container protrusion, an outer ring of the mixing head is evenly fitted with mixing teeth, and an inner part of the mixing head is symmetrically fitted with mixing head magnetic blocks.

In the yogurt maker, the mixing device further includes a power device, and the power device comprises:
a magnetic component, the magnetic component extends into a mixing container cavity formed by a vertical upward extension of the bottom of the mixing container, and the magnetic component is fitted with magnetic blocks;
a motor, the motor drives a rotation of the magnetic component via a rotating shaft, and a magnetic force between the magnetic blocks and the mixing head magnetic blocks drives a rotation of the mixing head.

In the yogurt maker, the mixing device further comprises a mixing lid. The mixing lid includes a mixing lid first end that matches the mixing head and a mixing lid second end that matches the mixing container protrusion. After the mixing lid is sleeved over the mixing container protrusion, the mixing lid covers the mixing head. An inner side of the mixing lid first end is fitted with convex teeth that engage with the mixing teeth of the mixing head.

In the yogurt maker, the temperature sensor is an NTC thermistor, the heater is an induction heating coil, and the temperature sensor comprises:
a probe, the probe is set between the upper lid and the mixing container, and the probe is in contact with the bottom of the mixing container and the probe is an NTC probe;
a connector, the connector passes through the upper lid to connect the probe to the heater.

In the yogurt maker, the center of the base has an upper lid. The upper lid divides the base into a first cavity with an upper opening and a second cavity located below the first cavity, and the mixing container is housed in the first cavity.

In the yogurt maker, there is a plurality of pliant pads on the upper lid, and the mixing container is supported by the pliant pads after it is placed in the first cavity, so as to avoid damage caused by collision between the mixing container and the upper lid.

In the yogurt maker, wherein the yogurt maker further comprises a control circuit board. The control circuit board is located in the second cavity of the base, and it is electrically connected to the temperature control device and mixing device separately.

A method for making yogurt using the described yogurt maker, the steps comprise:
S100: pouring milk and lactic acid bacteria into the mixing container in proportion;

S200: turning on the yogurt maker. The mixing device starts to mix a mixture of milk and lactic acid bacteria, and the temperature control device starts to heat the mixture and monitor a temperature of the mixture;

S300: when the temperature control device detects that the mixture has reached the preset temperature, the yogurt maker stops mixing and enters a heat preservation mode;

S400: when a duration of the heat preservation mode exceeds a preset time, the yogurt maker enters a standby mode.

In the method for making yogurt, the preset temperature does not exceed 46° C.

Compared with the prior art, the present disclosure provides a yogurt maker and its method of use. In the present disclosure, a vertical upwardly extending mixing container protrusion is set at the bottom of the mixing container of the yogurt maker and a mixing head is sleeved on the mixing container protrusion, and the rotation of the mixing head is driven by a power device so that the mixing head can mix the mixture in the mixing container well. The mixing head can be removed during cleaning, thereby avoiding hygienic blind spots and reducing the difficulty of cleaning. At the same time, a temperature sensor is installed at the bottom of the mixing container to monitor the temperature of the mixing container, so as to ensure constant heat preservation conditions in different environments.

DETAILED DESCRIPTION

The present disclosure provides a yogurt maker and method for using the same. In order to make the objectives, technical solutions and effects of the present disclosure clearer and more specific, the present disclosure will be described in further detail below. It should be understood that the specific embodiments described here are only used to explain the present disclosure, and are not used to limit the present disclosure.

It should be noted that the orientational and positional relationships indicated by the terms "center", "upper/above", "lower/below", "left", "right", "inner/inside", "outer/outside", "vertical/perpendicular", "horizontal/level", "flush", etc. are based on the orientational and positional relationships indicated by the drawings. They are only for the convenience of describing the present disclosure and simplifying the description, and are not for indicating or implying that the structure referred to must have a specific orientation or must be constructed in a specific orientation, nor shall they be understood as limitations of the present disclosure.

In addition, unless the article is specifically defined by the context, "a" and "the" can generally refer to a single item or a plurality of items. If there are descriptions of "first", "second" and the like in the embodiments of the present disclosure, the descriptions of "first", "second" and the like are only for the purpose of description, and shall not be understood as indicating or implying their relative importance or implicitly indicating the number of technical features referred to. Thus, features defined as "first" and "second" may explicitly or implicitly include at least one of such features. In addition, the technical solutions between the various embodiments can be combined with each other, but they must be based on what can be achieved by those of ordinary skill in the art. Where the combination of technical solutions is contradictory or cannot be realized, it should be considered that such a combination of technical solutions does not exist and is not within the claimed scope of protection of the present disclosure.

Figure 1:
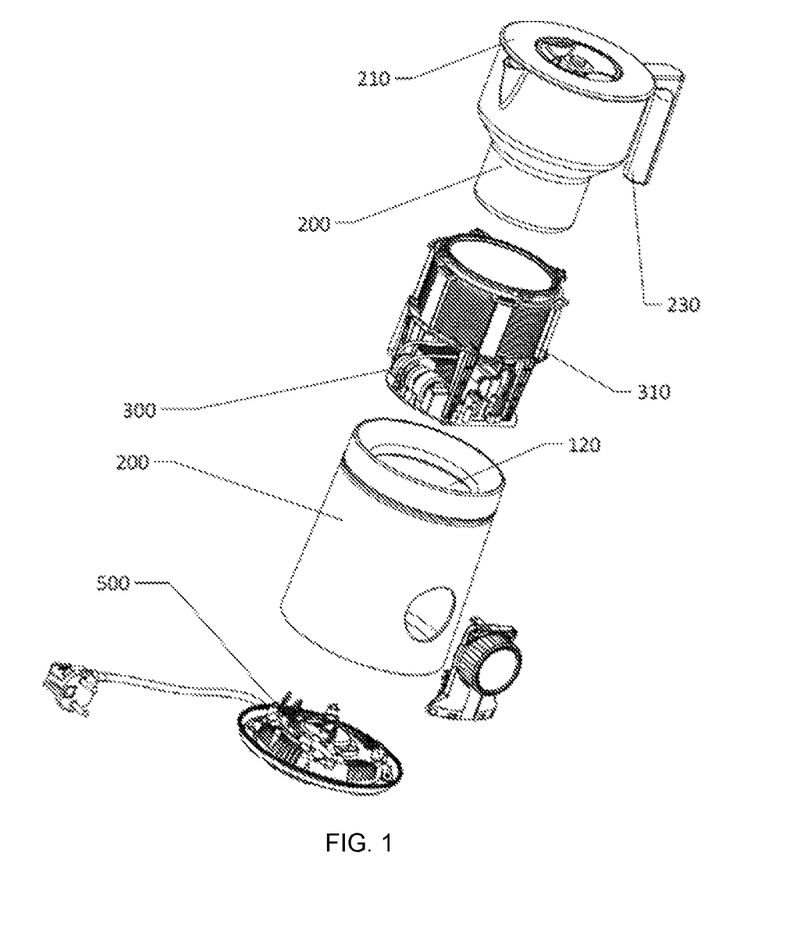
FIG. 1 is an exploded-view diagram of the yogurt maker of the present disclosure.
Figure 2:
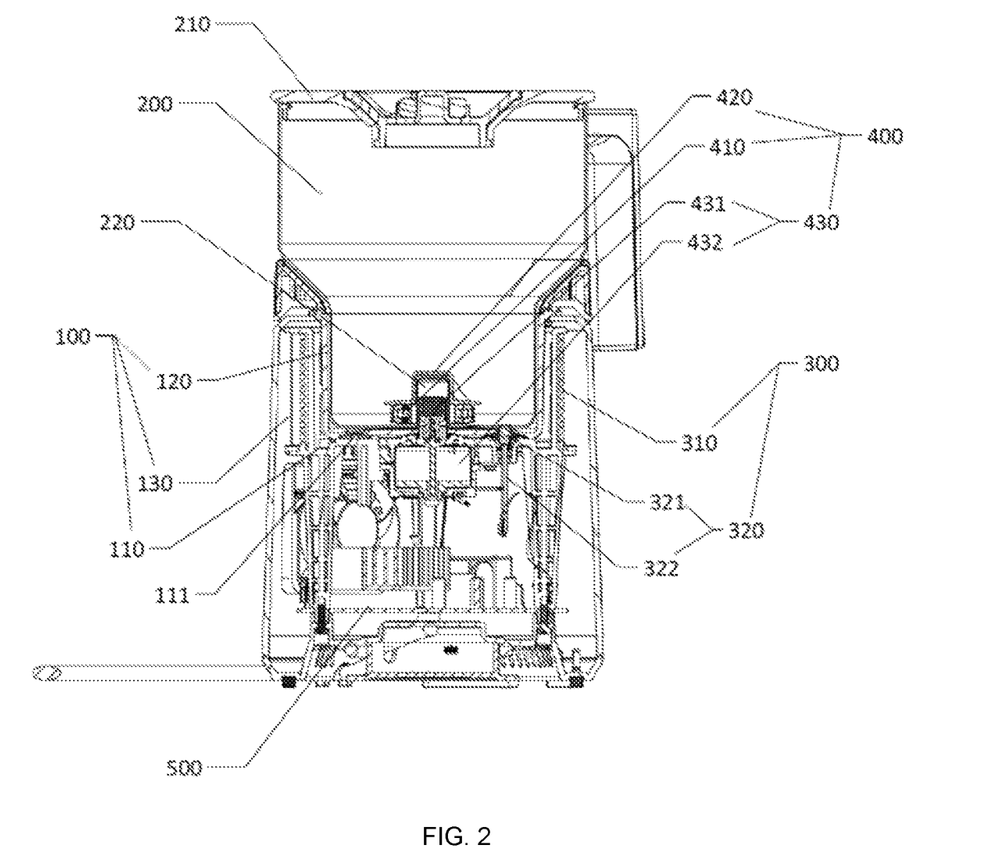
FIG. 2 is a cutaway diagram of the yogurt maker of the present disclosure.

The present disclosure provides a yogurt maker. As shown in FIG. 1 and FIG. 2, the yogurt maker comprises a base 100, a mixing container 200, a temperature control device 300 and a mixing device 400. When yogurt needs to be made, the mixing container 200 is placed on the base 100 and a mixture of milk and lactic acid bacteria is added to the mixing container 200. The mixture of milk and lactic acid bacteria is mixed uniformly and kept warm at 42° C.-45° C. for 8-10 hours with the temperature control device 300 and the mixing device 400 to obtain solidified yogurt.

As shown in FIG. 2, the base 100 has an upper lid 110, which divides the base 100 into a first cavity 120 and a second cavity 130. The first cavity 120 is a holding cavity with an upper opening, and the second cavity 130 is a closed cavity located below the first cavity 120. The second cavity 130 of the base 100 is also provided with a control circuit board 500, and the control circuit board 500 is separately connected to the temperature control device 300 and the mixing device 400 electrically.

Figure 3:
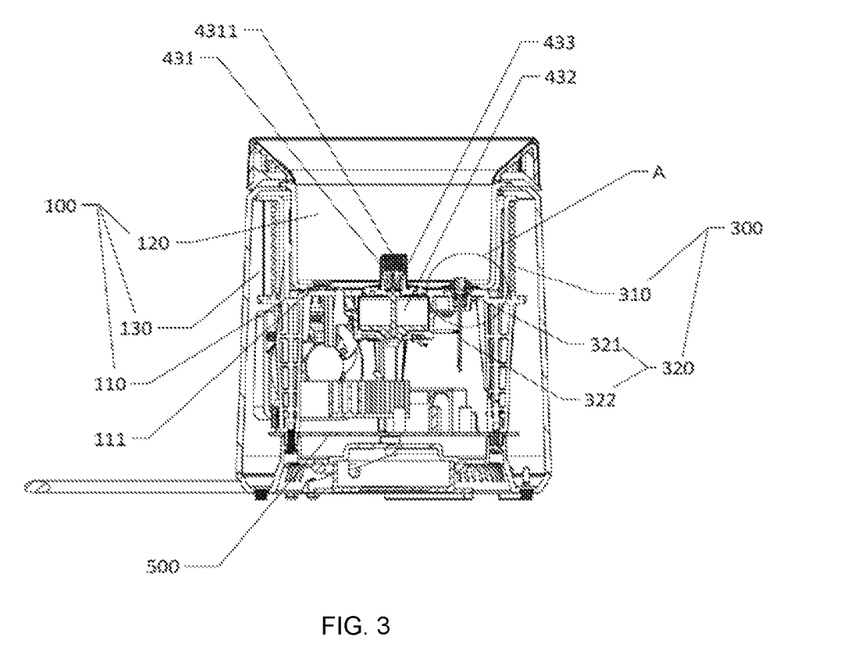
FIG. 3 is a cutaway diagram of the base of the yogurt maker of the present disclosure.

As shown in FIG. 3, the first cavity 120 is located in the upper half of the base and has an upper opening, and the second cavity 130 is located below the first cavity 120. The center of the upper lid 110 is depressed downward to form the first cavity 120, and a gap is left between the side wall of the upper lid 110 and the base 100.

As shown in FIG. 2, the mixing container 200 is placed on the upper lid 110 via the opening above the base 100 and is housed in the first cavity 120. The mixing container 200 comprises a first end that matches the first cavity 120, and a second end that matches the opening above the base 100, and the size of the first end is smaller than the size of the second end. The mixing container 200 is also provided with a mixing container lid 210. After a liquid mixture of milk and lactic acid bacteria is added to the mixing container 200, the mixing container lid 210 is clamped over the mixing container 200 and the mixture is sealed in the mixing container 200 to prevent liquid from splashing out of the mixing container and dirtying the surrounding when making yogurt. One side of the mixing container 200 is also provided with a mixing container handle 230, and the user can move the mixing container 200 with the mixing container handle 230.

Figure 5:
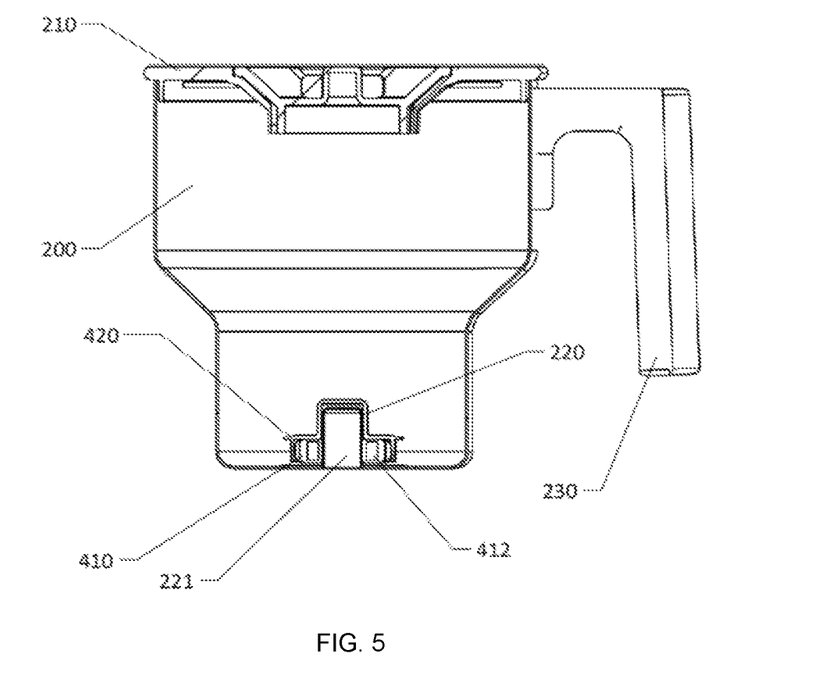
FIG. 5 is a cutaway diagram of the mixing container of the yogurt maker of the present disclosure.

As shown in FIG. 5, the center of the bottom of the mixing container 200 extends vertically upward to form a cylindrical mixing container protrusion 220 that has a height difference with the bottom of the mixing container 200, and a mixing container cavity 221 is formed due to the vertical upward extension of the bottom of the mixing container 200 and the upward concavity of the outer side of the bottom of the mixing container 200. The mixing container protrusion 220 is a cylindrical protrusion, and when the mixing container protrusion 220 is viewed from above, the cross-section of the mixing container protrusion 220 is circular.

Figure 7:
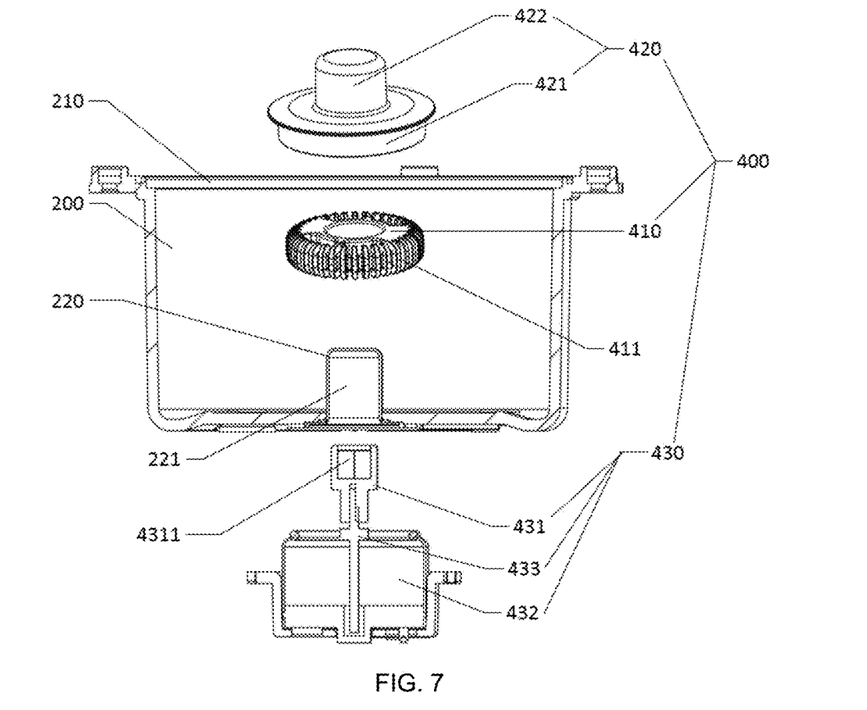
FIG. 7 is an exploded-view diagram of the mixing device of the present disclosure.
Figure 8:
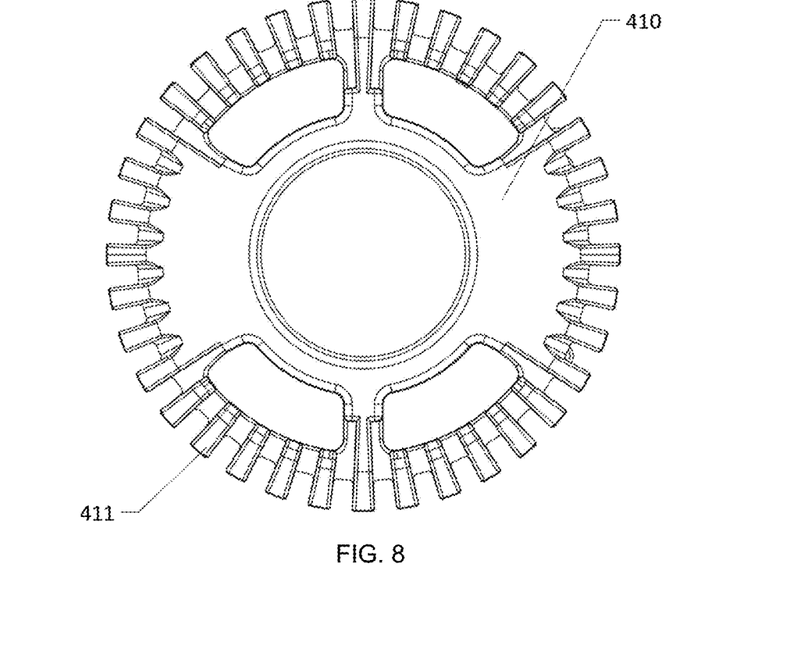
FIG. 8 is a front view of the mixing head of the present disclosure.

As shown in FIG. 7, the mixing device comprises a mixing head 410, a mixing lid 420 and a power device 430. The mixing head 410 is located in the mixing container 200, as shown in FIG. 2 and FIG. 5, wherein the mixing head 410 is detachably sleeved on the mixing container protrusion 220. As shown in FIG. 8, the mixing head 410 is toroidal and has a symmetrical structure, wherein the inner ring of the toroidal mixing head 410 matches the dimensions of the mixing container protrusion 220, the mixing head 410 is sleeved on the mixing container protrusion 220 via the inner ring, and the mixing head 410 can slide up and down freely along the mixing container protrusion 220 such that the mixing head 410 can be easily installed and removed. Since the mixing head 410 has a symmetrical structure, when liquid is added to the mixing container 200, the mixing head 410 will not tilt due to one side being too heavy and result in scratching between the mixing head 410 and the mixing container protrusion 220, which would affect the mixing effect. The outer ring of the mixing head 410 is provided with a ring of mixing teeth 411, wherein the mixing teeth 411 are evenly arranged on the circumference of the outer ring of the mixing head 410, and the orientation of the mixing teeth 411 is consistent with the radial orientation of the mixing head 410, forming a stable mixing structure. Further, the mixing head 410 may be designed with a symmetrical hollow structure to reduce the weight of the mixing head 410, so as to reduce the friction between the mixing head 410 and the mixing container protrusion 220. When the mixing head 410 starts rotating, the mixing head 410 drives the synchronized rotation of the surrounding liquid via the mixing teeth 411. Since the mixing teeth 411 are evenly and densely arranged, it can be ensured that the liquid is mixed well and the heat is evenly diffused, thereby ensuring that the same temperature is maintained throughout the mixture of milk and lactic acid bacteria. At the same time, as the mixing head 410 can slide freely along the mixing container protrusion 220, the mixing head 410 can be removed from the mixing container 200 after use, and the mixing container 200 and mixing head 410 can then be cleaned separately. There will not be any hygienic blind spots and the difficulty of cleaning is reduced, effectively avoiding bacterial residue in the yogurt production process, ensuring the food safety of subsequent yogurt production, and improving the quality of yogurt.

As shown in FIG. 3, the power device 430 comprises a magnetic component 431 and a motor 432. The motor 432 is located in the second cavity 130 of the base 100 and under the upper lid 110. The motor 432 is connected to the magnetic component 431 through the rotating shaft 433 that passes through the upper lid 110. The magnetic component 431 is supported by the rotating shaft 433 and is located in the mixing container cavity 221 of the mixing container 200. As shown in FIG. 5 and FIG. 7, there are a pair of magnetic blocks 4311 in the magnetic component 431. Mixing head magnetic blocks 412 are symmetrically encapsulated in the mixing head 410, and the magnetic blocks 4311 correspond to the mixing head magnetic blocks 412. Further, the magnetic blocks 4311 are rectangular magnetic blocks, and the mixing head magnetic blocks 412 are fan-shaped magnetic blocks. In the static state, under the action of the magnetic force between the mixing head magnetic blocks 412 and the magnetic blocks 4311, the mixing head 410 remains relatively fixed to the mixing container protrusion 220, and the mixing head 410 will not fall off from the mixing container protrusion 220 even if milk is added. At the same time, under the action of the magnetic force between the mixing head magnetic blocks 412 and the magnetic blocks 4311, the mixing head 410 is suspended and sleeved on the mixing container protrusion 220 to prevent contact between the mixing head 410 and the bottom of the mixing container 200, so as to reduce friction and facilitate mixing, and also to prevent secondary contamination or prevent the lactic acid bacteria powder added from adhering to the mixing head 410. When entering the mixing state, the motor 432 drives the rotation of the magnetic component 431 through the rotating shaft 433, with the magnetic blocks 4311 rotating synchronously and driving the rotation of the mixing head magnetic blocks 412, and the mixing head 410 starts to rotate while suspended and drive the rotation of the liquid in the mixing container 200, ensuring that the mixture of milk and lactic acid bacteria is mixed well and the heat is evenly diffused, thereby ensuring that the same temperature is maintained throughout the mixture of milk and lactic acid bacteria, and providing a stable reaction environment for yogurt fermentation. After yogurt is made, since the mixing head 410 and the power device 430 only interact with each other through magnetic force, the mixing head 410 can be easily removed from the mixing container protrusion 220 for cleaning after the mixing container 200 is removed from the base 100. This reduces the difficulty of cleaning, effectively prevents bacteria or residues from being left in the yogurt maker, ensures the food safety of subsequent yogurt production, and improves the quality of yogurt.

Figure 9:
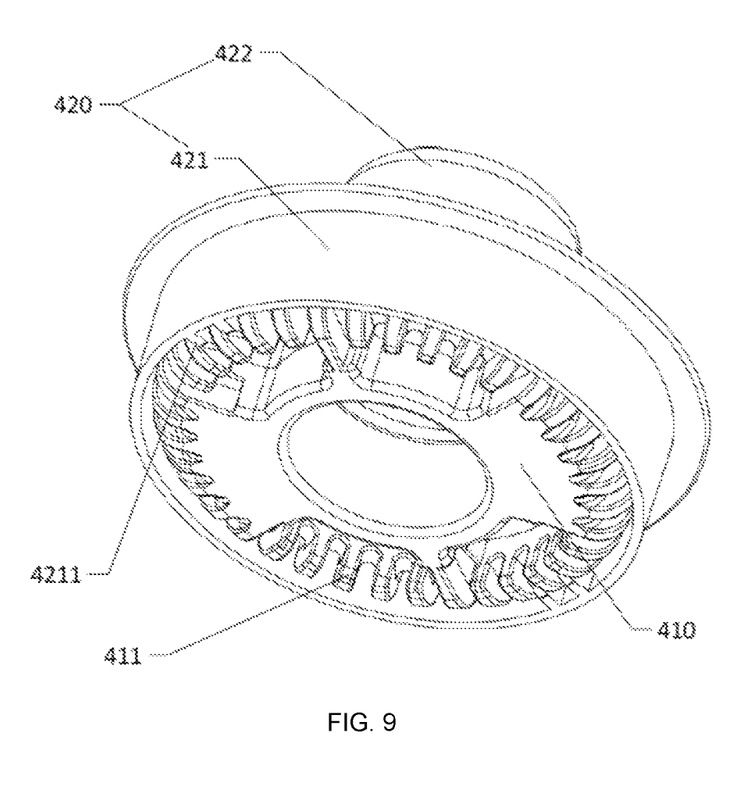
FIG. 9 is a schematic diagram of the combined mixing head and mixing lid of the present disclosure.

As shown in FIG. 5, the mixing lid 420 needs to be sleeved on the mixing head 410 after the mixing head 410 is sleeved on the mixing container protrusion 220. As shown in FIG. 9, the mixing lid 420 comprises the mixing lid first end 421 that matches the outer ring of the mixing head 410 and the mixing lid second end 422 that matches the mixing container protrusion 220, and the mixing lid 420 covers the mixing head 410 after the mixing lid 420 is sleeved on the mixing container protrusion 220. The inner side of the mixing lid first end 421 is fitted with convex teeth 4211 that match with the mixing teeth 411 of the mixing head 410. After the mixing lid 420 is sleeved on the mixing head 410, the convex teeth 4211 engage with the mixing teeth 411. After the mixing head 410 is sleeved on the mixing container protrusion 220, the mixing lid 420 is sleeved on the mixing head 410, thereby preventing solid powder from falling into the mixing head 410 and jamming the mixing head 410 when adding ingredients, and reducing the impact on the mixing effect. The mixing lid first end 421 of the mixing lid 420 engages with the mixing teeth 411 of the mixing head 410 via the convex teeth 4211. The mixing lid second end 422 is sleeved on the mixing container protrusion 220, and the mixing lid 420 will not fall off the mixing head 410 after milk is added. Since the mixing lid 420 is engaged and held in place by the mixing teeth 411 of the mixing head 410 via the convex teeth 4211, the mixing lid 420 will not affect the contact between the mixing teeth 411 and the mixture. When the mixing head 410 starts rotating, the mixing lid 420 rotates along with it, and the mixing effect of the mixing head 410 is not affected. This not only ensures that the milk and lactic acid bacteria are well mixed and the heat is evenly diffused, but also prevents granular powder from falling between the mixing teeth 411 of the mixing head 410 and jamming the mixing head 410. After yogurt is made, the mixing lid 420 can be very easily removed from the mixing head 410 and the mixing container protrusion 220, and the mixing head 410 can then be removed from the mixing container protrusion 220, so as to separately clean the mixing head 410, the mixing lid 420 and the mixing container 200. There are no hygienic blind spots, which makes cleaning easier and faster, effectively prevents bacteria or residues from being left in the yogurt maker, ensures the food safety of subsequent yogurt production, and improves the quality of yogurt.

As shown in FIG. 2, the temperature control device 300 comprises a heater 310 and a temperature sensor 320, and the heater 310 encircles the second cavity 130 of the base 100. Optionally, the heater 310 is an induction heating coil. Further, the heater 310 is located in the gap between the side wall of the upper lid 110 and the base 100, and the heater 310 relies on a vertical coil to generate electromagnetic induction through the upper lid 110 and the mixing container 200 to heat the mixing container 200, so as to prevent the temperature from rising too fast. The temperature sensor 320 comprises a probe 321 and a connector 322. As shown in FIG. 2, the probe 321 is located between the upper lid 110 and the mixing container 200, and the probe 321 is in contact with the bottom surface of the mixing container 200. The probe 321 passes through the upper lid 110 via the connector 322 to connect with the heater 310. The probe 321 detects the temperature of the mixture in the mixing container 200 to control the heating effect of the heater 310 on the mixing container 200. Optionally, the temperature sensor 320 is an NTC thermistor (negative temperature coefficient thermistor temperature sensor), and the probe 321 is an NTC probe. Temperature can be controlled to ±1° C. with the NTC thermistor, ensuring that temperature is constant in different environments during the fermentation of the mixture, and thereby guaranteeing the quality of the yogurt eventually obtained.

Further, the temperature control device 300 also includes a sealing ring 330, which is located between the probe 321 and the upper lid 110. The sealing ring 330 adheres closely to the probe 321, thereby isolating it from liquid, preventing spilled liquid from flowing down along the connector 322, and thereby preventing liquid from passing through the upper lid 110 and entering the second cavity 130 of the base 100, so as to protect the control circuit board 500. At the same time, the sealing ring 330 holds the probe 321 in place, preventing the probe 321 from tilting, and preventing the temperature monitoring from being affected by poor contact between the probe 321 and the mixing container 200.

Figure 4:
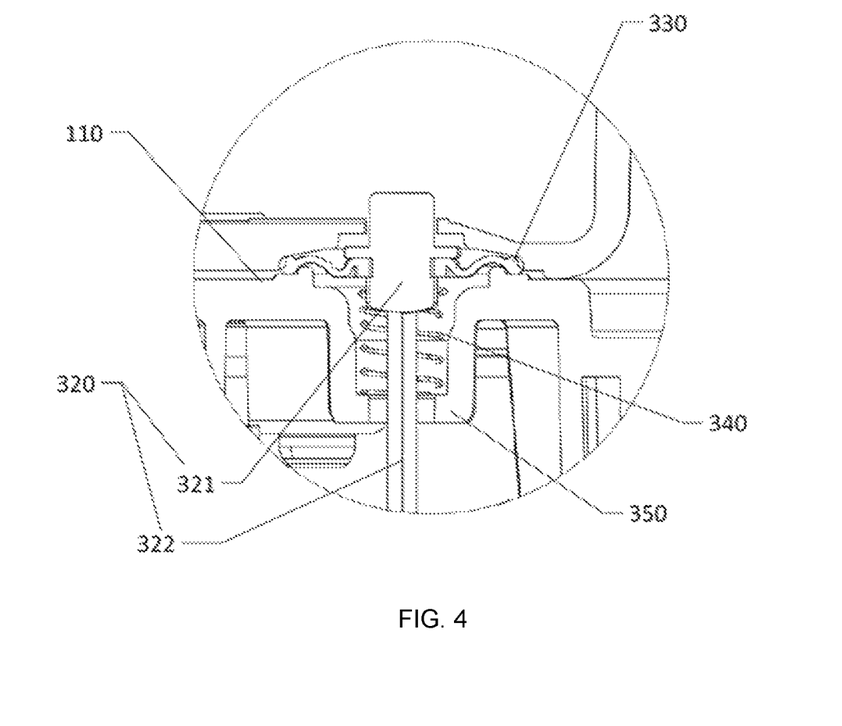
FIG. 4 is an enlarged schematic diagram of part A in FIG. 3.

Further, a probe-housing cavity 350 corresponding to the position of the probe 321 is located below the upper lid 110, as shown in FIG. 2 and FIG. 4, wherein the probe-housing cavity 350 is located directly below the probe 321 to prevent the probe 321 from falling into the second cavity 130 of the base 100. Further, the probe-housing cavity 350 is also provided with an elastic component 340, with the lower end of the elastic component 340 fixed to the bottom of the probe-housing cavity 350, and the top of the elastic component 340 connected to the probe 321. Optionally, the elastic component 340 is a spring. When placed in the mixing container 200, the bottom surface of the mixing container 200 gets in contact with the probe 321 and exerts a downward pressure on the probe 321. At this time, the elastic component 340 is compressed and exerts an upward rebound force on the probe 321, causing the probe 321 to maintain close contact with the bottom surface of the mixing container 200, and preventing the probe 321 from sliding away from the bottom surface of the mixing container 200. In addition, since the elastic component 340 exerts an upward rebound force on the probe 321 after it is compressed, the probe 321 can remain in contact with the bottom surface of the mixing container 200, ensuring effective contact between the probe 321 and the mixing container 200, thereby ensuring the temperature transmission effect and realizing the temperature monitoring of the mixture in the mixing container 200, so as to ensure that the temperature of the mixture during the fermentation process is constant in different environments, in order to obtain high-quality yogurt.

Figure 6:
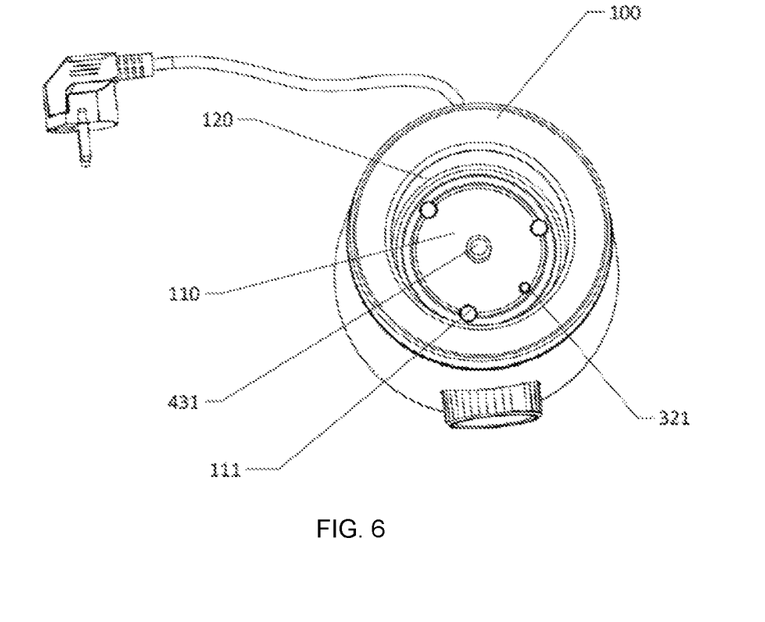
FIG. 6 is an oblique view of the base of the yogurt maker of the present disclosure.

There are also evenly distributed pliant pads 111 on the upper lid 110, as shown in FIG. 6, wherein three pliant pads 111 are distributed in three equal parts of a circle. When the mixing container 200 is placed in the base 100, the bottom surface of the mixing container 200 is placed on the pliant pads 111, and the top surface of the pliant pads 111 are kept in a horizontal plane, so as to ensure that the bottom surface of the mixing container 200 remains level after placement. Further, the pliant pads 111 are made of rubber. When the mixing container 200 is placed in the base 100, the mixing container 200 is supported by the pliant pads 111 and is not in direct contact with the upper lid 110. This can prevent the mixing container 200 from sliding relative to the upper lid 110. When the mixing device 400 starts rotating, the mixing head 410 mixes the mixture in the mixing container 200. Since the mixing container 200 is supported by the pliant pads 111 and is not in direct contact with the upper lid 110, this can effectively prevent the mixing container 200 from rotating relative to the upper lid 110, and at the same time prevent the mixing container 200 from colliding with the upper lid 110 and generating noise, thereby preventing damage from use.

The following illustrates the method of use of the yogurt maker of the present disclosure with examples. First place the mixing container 200 on the base 100. At this time, the bottom surface of the mixing container 200 is supported by the pliant pads 111 on the upper lid 110, and the magnetic component 431 of the power device extends into the mixing container cavity 221 of the mixing container 200. Sleeve the mixing head 410 on the mixing container protrusion 220 in the mixing container 200. Due to the magnetic force between the mixing head 410 and the magnetic component 431, the mixing head 410 will be suspended while sleeved on the mixing container protrusion 220. Sleeve the mixing lid 420 on the mixing container protrusion 220 and with it covering the mixing head 410, and pour a mixture of milk and lactic acid bacteria into the mixing container 200. Cover with the mixing container lid 210. The heater 310 heats the mixing container 200 via electromagnetic induction, and the motor 432 in the power device 430 starts to run and drive the rotation of the magnetic component 431 via the rotating shaft 433 and drive the synchronous rotation of the mixing head 410 in the mixing container 200 via magnetic force. The mixing head 410 rotates while suspended under the action of magnetic force, causing the mixture of milk and lactic acid bacteria to start mixing, so as to ensure that the mixture of milk and lactic acid bacteria is mixed well and heat is evenly diffused, thereby ensuring that the same temperature is maintained throughout the mixture of milk and lactic acid bacteria, and providing a stable reaction environment for yogurt fermentation. After the yogurt is made, the mixing container 200 is removed from the base 100, the mixing container lid 210 is opened, and the yogurt is poured out. The mixing lid 420 and the mixing head 410 are then removed from the mixing container protrusion 220. The mixing container 200, mixing head 410 and mixing lid 420 are cleaned separately. At this time, there are no hygienic blind spots in the mixing container 200, and the difficulty of cleaning is low. The mixing container 200, mixing head 410 and mixing lid 420 can be cleaned perfectly, so that the presence of residual bacteria or residues in the yogurt maker can be avoided the next time yogurt is made, thereby improving the food safety and the quality of the yogurt. Due to the presence of the mixing device 400 and the temperature control device 300, there is more precise control of the production conditions when using the yogurt maker of the present disclosure. It can be ensured that the milk and the lactic acid bacteria are mixed well, that the temperature throughout the mixture is kept consistent after mixing, and that a temperature accuracy of ±1° C. can be guaranteed in different environments in the heat preservation mode. In addition, the overall cleaning is convenient and this can ensure hygiene and safety during repeated use, so that the yogurt eventually produced is of good quality.

Figure 10:
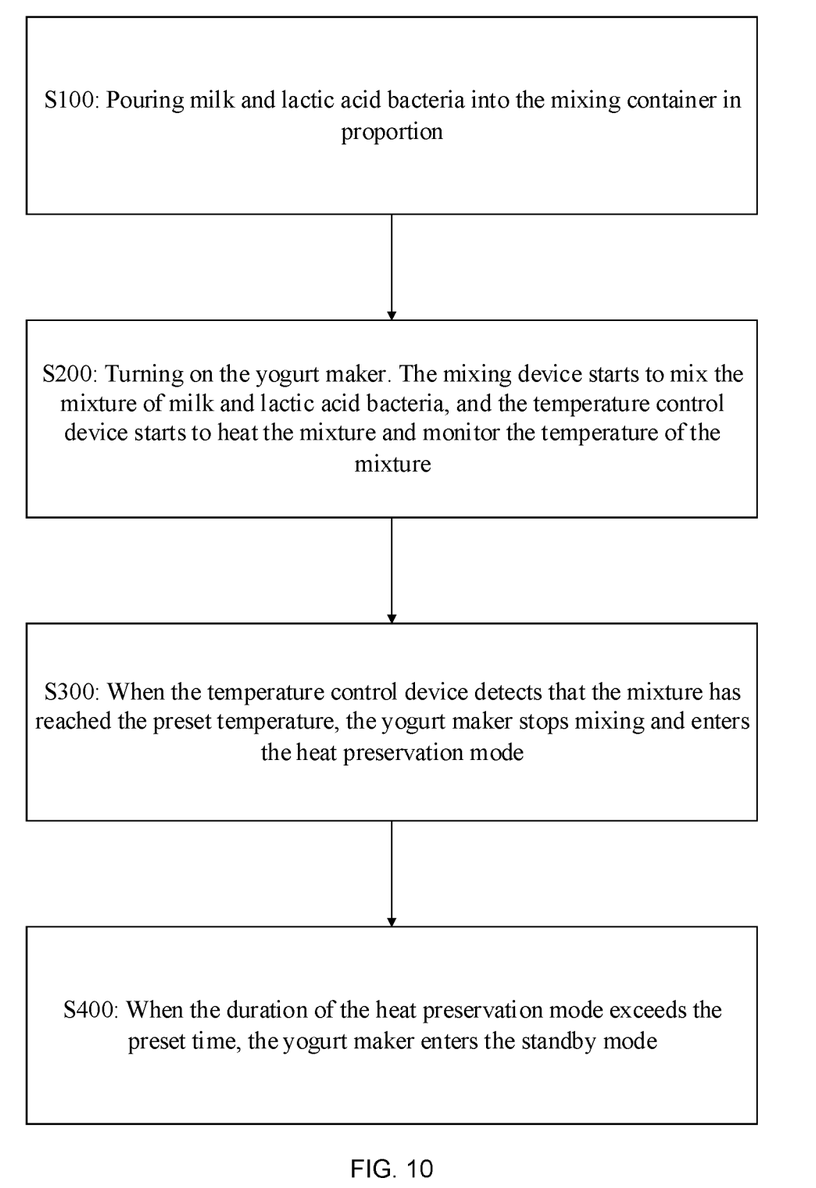
FIG. 10 is a flowchart for the method of making yogurt using the yogurt maker of the present disclosure.

As shown in FIG. 10, the present disclosure also provides a method for making yogurt using the yogurt maker of the present disclosure, and the steps comprise:

S100: pouring milk and lactic acid bacteria into the mixing container in proportion;

S200: turning on the yogurt maker. The mixing device starts to mix the mixture of milk and lactic acid bacteria, and the temperature control device starts to heat the mixture and monitor the temperature of the mixture;

S300: when the temperature control device detects that the mixture has reached the preset temperature, the yogurt maker stops mixing and enters the heat preservation mode;

S400: when the duration of the heat preservation mode exceeds the preset time, the yogurt maker enters the standby mode.

Wherein, the preset temperature should be no more than 46° C. and the preset time should be no less than eight hours.

Further, the preset temperature may be set to about 43° C. and the preset time may be set to 8-10 hours.

Further, two hours before entering the heat preservation mode, heating should be activated and mixing should be started simultaneously when the temperature is detected to be lower than 41.5° C.; when the temperature reaches 43° C., heating should be discontinued and mixing should stop to ensure that the lactic acid bacteria and milk are mixed well. Mixing will no longer be performed two hours after entering the heat preservation mode. Heating will be activated when the temperature is lower than 41.5° C. and discontinued when the temperature reaches 43° C., so as to facilitate the solidification of yogurt.

In addition, the following steps may be included before step S100: wiping the inside of the mixing container so that it is dry and free of oil, sleeve the mixing head on the mixing container protrusion, and sleeve the mixing lid on the mixing container protrusion and the mixing head.

In summary, the present disclosure provides a yogurt maker and its method of use. In the present disclosure, a vertical upwardly extending mixing container protrusion is set at the bottom of the mixing container of the yogurt maker and a mixing head is sleeved on the mixing container protrusion, and the rotation of the mixing head is driven by a power device so that the mixing head can mix the mixture in the mixing container well. In addition, the mixing head can be removed during cleaning, so as to reduce hygienic blind spots and reduce the difficulty of cleaning. At the same time, a temperature sensor is installed at the bottom of the mixing container to monitor the temperature of the mixing container, so as to ensure constant heat preservation conditions in different environments. By using a unique mixing device, the difficulty of cleaning the yogurt maker of the present disclosure is reduced, ensuring that the yogurt maker can be easily cleaned each time after yogurt is made, and at the same time ensuring that the mixture of milk and lactic acid bacteria is mixed well during the yogurt-making process. The installation of a temperature control device with a temperature sensor can ensure constant heat preservation conditions during the yogurt fermentation process, such that high-quality yogurt can be obtained.

It should be understood that the application of the present disclosure is not limited to the above-mentioned examples. Those of ordinary skill in the art can make improvements or changes based on the above description, and all these improvements and changes shall fall within the scope of protection of the appended claims of the present disclosure.

What is claimed is:

1. A yogurt maker, comprising:
  a base;
  a mixing container, wherein the mixing container is placed on the base, a center of a bottom of the mixing container extends vertically upward to form a cylindrical mixing container protrusion, and the mixing container is configured for fermentation to make yogurt;
  a mixing device, wherein the mixing device comprises a mixing head that is detachably sleeved on the mixing container protrusion, and the mixing device is configured for mixing the yogurt in the mixing container well; and
  a temperature control device, wherein the temperature control device comprises a heater that encircles the mixing container and a temperature sensor that is in contact with the bottom of the mixing container, the temperature control device is configured for controlling a temperature of the yogurt in the mixing container during different fermentation stages,
  wherein the mixing head is toroidal, an inner ring of the mixing head matches the mixing container protrusion, an outer ring of the mixing head is evenly fitted with mixing teeth, and an inner part of the mixing head is symmetrically fitted with mixing head magnetic blocks of the mixing head, and
  the mixing device further comprises a mixing lid, the mixing lid comprises a mixing lid first end that matches the mixing head and a mixing lid second end that matches the mixing container protrusion, after the mixing lid is sleeved over the mixing container protrusion, the mixing lid covers the mixing head, an inner side of the mixing lid first end is fitted with convex teeth that engage with the mixing teeth of the mixing head.

2. The yogurt maker according to claim 1, wherein the mixing device further comprises a power device, and the power device comprises:
  a magnetic component, the magnetic component extends into a mixing container cavity formed by a vertical upward extension of the bottom of the mixing container, and the magnetic component is fitted with magnetic blocks;
  a motor, the motor drives a rotation of the magnetic component via a rotating shaft, and the mixing head rotates when the rotating shaft is rotated by the motor.

3. The yogurt maker according to claim 1, wherein the base comprises an upper lid on a center of the base, the upper lid divides the base into a first cavity with an upper opening and a second cavity located below the first cavity, and the mixing container is housed in the first cavity.

4. The yogurt maker according to claim 3, wherein the temperature sensor is an NTC thermistor, the heater is an induction heating coil, and the temperature sensor comprises:
a probe, the probe is set between the upper lid and the mixing container, and the probe is in contact with the bottom of the mixing container and the probe is an NTC probe;
a connector, the connector passes through the upper lid to connect the probe to the heater.

5. The yogurt maker according to claim 3, wherein the upper lid comprises a plurality of pliant pads, and the mixing container is supported by the plurality of pliant pads after being placed in the first cavity, the plurality of pliant pads prevents the mixing container and from colliding with the upper lid.

6. The yogurt maker according to claim 3, wherein the yogurt maker further comprises a control circuit board, the control circuit board is located in the second cavity of the base, and is electrically connected to the temperature control device and mixing device separately.

7. A yogurt maker, wherein comprising:
a base;
a mixing container, wherein the mixing container is placed on the base, a center of a bottom of the mixing container extends vertically upward to form a cylindrical mixing container protrusion, and the mixing container is configured for fermentation to make yogurt;
a mixing device, wherein the mixing device comprises a mixing head that is detachably sleeved on the mixing container protrusion, and the mixing device is configured for mixing the yogurt in the mixing container well; and
a temperature control device, wherein the temperature control device comprises a heater that encircles the mixing container and a temperature sensor that is in contact with the bottom of the mixing container, the temperature control device is configured for controlling a temperature of the yogurt in the mixing container during different fermentation stages, wherein
the base comprises an upper lid on a center of the base, the upper lid divides the base into a first cavity with an upper opening and a second cavity located below the first cavity, and the mixing container is housed in the first cavity;
the temperature sensor is an NTC thermistor, the heater is an induction heating coil, and the temperature sensor comprises:
a probe set between the upper lid and the mixing container, and in contact with the bottom of the mixing container and the probe is an NTC probe; and
a connector extending through the upper lid to connect the probe to the heater.

8. A method for making yogurt using the yogurt maker according to claim 7, wherein comprising a plurality of following steps:
pouring milk and lactic acid bacteria into the mixing container of the yogurt maker in proportion;
turning on the yogurt maker, the mixing device of the yogurt maker starts to mix a mixture of milk and lactic acid bacteria, and the temperature control device of the yogurt maker starts to heat the mixture and monitor a temperature of the mixture;
when the temperature control device detects that the mixture has reached a preset temperature, the yogurt maker stops mixing and enters a heat preservation mode;
when a duration of the heat preservation mode exceeds a preset time, the yogurt maker enters a standby mode.

9. The method for making yogurt according to claim 8, wherein the preset temperature does not exceed 46° C.

10. The yogurt maker according to claim 7, wherein the mixing head is toroidal, an inner ring of the mixing head matches the mixing container protrusion, an outer ring of the mixing head is evenly fitted with mixing teeth, and an inner part of the mixing head is symmetrically fitted with mixing head magnetic blocks of the mixing head.

11. The yogurt maker according to claim 10, wherein the mixing device further comprises a power device, and the power device comprises:
a magnetic component, the magnetic component extends into a mixing container cavity formed by a vertical upward extension of the bottom of the mixing container, and the magnetic component is fitted with magnetic blocks;
a motor, the motor drives a rotation of the magnetic component via a rotating shaft, and the mixing head rotates when the rotating shaft is rotated by the motor.

12. The yogurt maker according to claim 10, wherein the mixing device further comprises a mixing lid, the mixing lid comprises a mixing lid first end that matches the mixing head and a mixing lid second end that matches the mixing container protrusion, after the mixing lid is sleeved over the mixing container protrusion, the mixing lid covers the mixing head, an inner side of the mixing lid first end is fitted with convex teeth that engage with the mixing teeth of the mixing head.

13. The yogurt maker according to claim 7, wherein the yogurt maker further comprises a control circuit board, the control circuit board is located in the second cavity of the base, and is electrically connected to the temperature control device and mixing device separately.

14. A yogurt maker, wherein comprising:
a base;
a mixing container, wherein the mixing container is placed on the base, a center of a bottom of the mixing container extends vertically upward to form a cylindrical mixing container protrusion, and the mixing container is configured for fermentation to make yogurt;
a mixing device, wherein the mixing device comprises a mixing head that is detachably sleeved on the mixing container protrusion, and the mixing device is configured for mixing the yogurt in the mixing container well; and
a temperature control device comprises a heater that encircles the mixing container and a temperature sensor that is in contact with the bottom of the mixing container, the temperature control device is configured for controlling a temperature of the yogurt in the mixing container during different fermentation stages, wherein
the base comprises an upper lid on a center of the base, the upper lid divides the base into a first cavity with an upper opening and a second cavity located below the first cavity, and the mixing container is housed in the first cavity,
the upper lid comprises a plurality of pliant pads, and the mixing container is supported by the plurality of pliant pads after being placed in the first cavity, the plurality of pliant pads prevents the mixing container from colliding with the upper lid.

15. The yogurt maker according to claim 14, wherein the mixing head is toroidal, an inner ring of the mixing head matches the mixing container protrusion, an outer ring of the mixing head is evenly fitted with mixing teeth, and an inner part of the mixing head is symmetrically fitted with mixing head magnetic blocks of the mixing head.

16. The yogurt maker according to claim 15, wherein the mixing device further comprises a power device, and the power device comprises:

a magnetic component, the magnetic component extends into a mixing container cavity formed by a vertical upward extension of the bottom of the mixing container, and the magnetic component is fitted with magnetic blocks;

a motor, the motor drives a rotation of the magnetic component via a rotating shaft, and the mixing head rotates when the rotating shaft is rotated by the motor.

17. The yogurt maker according to claim 15, wherein the mixing device further comprises a mixing lid, the mixing lid comprises a mixing lid first end that matches the mixing head and a mixing lid second end that matches the mixing container protrusion, after the mixing lid is sleeved over the mixing container protrusion, the mixing lid covers the mixing head, an inner side of the mixing lid first end is fitted with convex teeth that engage with the mixing teeth of the mixing head.

18. The yogurt maker according to claim 14, wherein the yogurt maker further comprises a control circuit board, the control circuit board is located in the second cavity of the base, and is electrically connected to the temperature control device and mixing device separately.

\* \* \* \* \*